US008645300B1

(12) United States Patent
Cowdrey et al.

(10) Patent No.: US 8,645,300 B1
(45) Date of Patent: Feb. 4, 2014

(54) SYSTEM AND METHOD FOR INTENT DATA PROCESSING

(75) Inventors: Russell Cowdrey, Coppell, TX (US); Jason Cone, Denton, TX (US); Brad Cranford, Irving, TX (US)

(73) Assignee: Usability Sciences Corporation, Irving, TX (US)

( * ) Notice: Subject to any disclaimer, the term of this patent is extended or adjusted under 35 U.S.C. 154(b) by 264 days.

(21) Appl. No.: 13/186,787

(22) Filed: Jul. 20, 2011

(51) Int. Cl.
*G06N 5/04* (2006.01)

(52) U.S. Cl.
USPC ........................................................ 706/46

(58) Field of Classification Search
None
See application file for complete search history.

(56) References Cited

U.S. PATENT DOCUMENTS

| | | | | |
|---|---|---|---|---|
| 6,093,026 | A * | 7/2000 | Walker et al. | 434/322 |
| 6,895,437 | B1 * | 5/2005 | Cowdrey et al. | 709/224 |
| 6,993,586 | B2 * | 1/2006 | Chen et al. | 709/228 |
| 7,013,285 | B1 * | 3/2006 | Rebane | 705/7.31 |
| 7,487,435 | B2 * | 2/2009 | Aviv | 715/205 |
| 2008/0086559 | A1 * | 4/2008 | Davis et al. | 709/224 |
| 2009/0210806 | A1 * | 8/2009 | Dodson et al. | 715/760 |
| 2010/0023475 | A1 * | 1/2010 | Lahav | 706/59 |
| 2010/0106703 | A1 * | 4/2010 | Cramer | 707/706 |
| 2010/0131835 | A1 * | 5/2010 | Kumar et al. | 715/205 |
| 2011/0047120 | A1 * | 2/2011 | Kamvar et al. | 706/50 |
| 2011/0246406 | A1 * | 10/2011 | Lahav et al. | 706/46 |
| 2011/0320440 | A1 * | 12/2011 | McDonald et al. | 707/723 |
| 2012/0123857 | A1 * | 5/2012 | Surve et al. | 705/14.49 |
| 2012/0215664 | A1 * | 8/2012 | Dalal et al. | 705/27.1 |
| 2012/0254149 | A1 * | 10/2012 | Ramsay | 707/709 |
| 2012/0284597 | A1 * | 11/2012 | Burkard et al. | 715/205 |

* cited by examiner

*Primary Examiner* — Jeffrey A Gaffin
*Assistant Examiner* — Dave Misir (57) ABSTRACT

Website navigation may be enhanced by recording a visitor's intent and recording page rankings that indicate how well the pages of a website match the visitor's intent. Using historical intent data, an intent can be inferred for a visitor based on a URL. Page recommendations can also be made once a visitor has confirmed their intent by determining a ranked list of URLs for the indicated intent. Intent data may be collected and displayed by integrating an intent widget into webpages of a website.

17 Claims, 9 Drawing Sheets

SYSTEM AND METHOD FOR INTENT DATA PROCESSING

FIELD OF THE INVENTION

This disclosure relates to systems and methods for processing information from visitors to one or more websites.

BACKGROUND OF THE INVENTION

Websites have become valuable resources for companies to engage consumers and customers. Paramount to the success of a website is that visitors to the website can readily identify and navigate to the pages within the website that contain the information or perform the functions that correspond to the visitor's intent.

What is required are improved systems and methods for determining a visitor's intent and for using the visitor's intent to predict and suggest webpages for the visitor.

SUMMARY OF THE INVENTION

In one aspect of the disclosure, there is provided a method for predicting an intent of a visitor to a webpage. The method comprises receiving into an intent engine at least one input parameter from a web browser displaying the webpage. The input parameter is processed by the intent engine to determine at least one inferred intent. The inferred intent can be sent to the visitor's web browser that is displaying the webpage so that the inferred intent is displayed to the visitor.

In one aspect of the disclosure, there is provided a method for predicting a navigation destination for a visitor of a webpage belonging to a defined namespace comprising a plurality of webpages. The method comprises prompting the visitor to indicate an intent on a webpage displayed at a browser of the visitor. The indicated intent is received into an intent engine for processing. Processing of the indicated intent comprises using the indicated intent as a reference to intent ranking data that ranks the plurality of webpages for the indicated intent. The intent ranking data may have been provided by previous visitors to one or more webpages of the namespace. The processing of the indicated intent determines one or more recommended webpages defined to be within the namespace that most match the indicated intent. Links to the recommended webpages can be displayed in the visitor's browser.

In one aspect of the disclosure, there is provided an intent processing system comprising an intent engine and at least one database configured to store intent data. The intent engine may be configured to display an intent tool in at least one webpage when the at least one webpage is loaded into a user browser. The intent tool may comprise a plurality of display elements including one or more of an intent field, a recommendation field, and a ranking tool. The intent engine may also be configured to display at least one intent in the intent field, display at least one webpage recommendation in the recommendation field, and receive ranking data from the ranking tool and store the ranking data in the at least one database.

BRIEF DESCRIPTION OF THE DRAWINGS

Reference will now be made, by way of example only, to specific embodiments and to the accompanying drawings in which.

DETAILED DESCRIPTION OF THE INVENTION

A website is generally formed of a plurality of distinct Uniform Resource Locators (URLs), each corresponding to a page of content. Each webpage of the website may represent different subject matter or a different function of the website, for example, separate webpages may be provided for ordering and purchases, order tracking, general information, etc.

When users visit a website, they are typically visiting for a particular purpose. By knowing the intent of their visit, that visitor can be more dynamically directed to the page within the website or namespace that best provides the information that the visitor is seeking.

Research and studies by the present inventors of online experiences have revealed the value of measuring and managing the interdependence of site visitor intent and success.

As visitors navigate the website, their intent information can be collected. The visitors may also be prompted to indicate how well the webpages they visit within the website match their intent. This information can then be analyzed to make recommendations to direct subsequent users to the most appropriate content on the website for the indicated intents.

Figure 1:
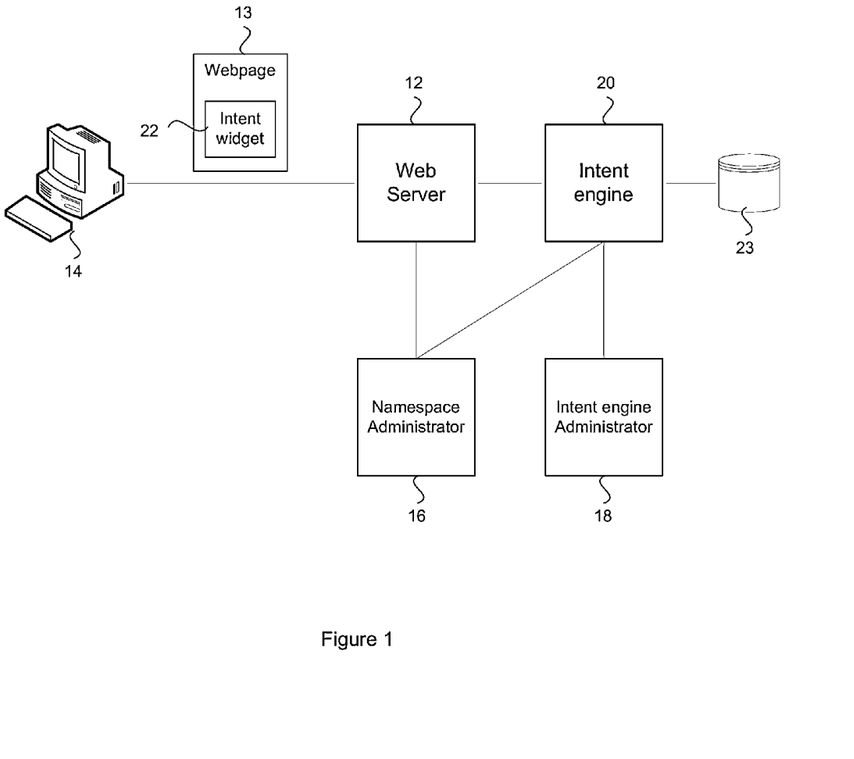
FIG. 1 depicts an intent processing system.

A system for collecting, analyzing and using intent data is illustrated in FIG. 1. The system includes a web server 12 that provides web pages 13 to a user at a web browser 14. Web pages are uploaded to the web server 12 from various web page administrators 16. Typically, an administrator will represent a business or the like who has responsibility for the content of a website that includes multiple web pages within a website. Multiple websites, each containing multiple webpages, may be owned and/or administered by a single entity. For example, a company may have separate websites for different geographic locations, or a company may have distinct sub-companies or divisions. For the purposes of the present description, the term "namespace" will be used to cover all webpages under the control of an administrator and will include webpages within a single website or within multiple websites. Thus, the web page administrator 16 will be referred to herein as a namespace administrator.

The system further includes an intent engine 20 that collects and analyzes intent data from visitors as they browse webpages within a namespace. In one embodiment, the intent engine 20 provides an intent tool 22 that is used in conjunction with one or more webpages 13 within a namespace. The intent tool 22 may incorporate user interface display elements into a webpage that elicit intent and success information from users. The intent tool provides the collected information to the intent engine 20. The intent engine 20 process the intent and success information and learns to predict intent and intent-based destination pages.

In one embodiment, the intent engine 20 learns from users' stated visit intent and intent based page ratings to provide predictive intent and predictive destination services via a compact and interactive web site widget. This tool fills a gap between traditional site navigation, faceted navigation, search, and social feedback programs to provide a unique, hybrid navigation and feedback tool that improves intent-based conversion metrics.

The intent engine 20 may be implemented on various platforms, such as .NET, or cloud based infrastructures such as Google App Engine (GAE), Microsoft Azure, Amazon EC2, Rackspace Cloud etc. Other implementations will be apparent to a person skilled in the art.

The intent tool will be described herein as a third party service offering made to owners and administrators of websites and namespaces. However, other implementations, such as direct installations by the website administrators will be apparent to a person skilled in the art. Similarly, the intent engine 20 will be described herein as remote from the web server 12. In various alternative embodiments, the intent engine may be incorporated into a web server and/or within a website of an organization. That is, intent data may be collected, analyzed and used directly by the web server and/or directly by the website owner.

The Intent engine 20 may control multiple namespaces for different customers and may be administered by an intent engine administrator 18. The intent engine 20 may be operatively associated with an intent database 23 for storing various intent related data, such as page views, intent candidates, recommendations for particular web pages, success data, etc., as will be described in greater detail below. Data within the intent database 23 may be grouped by namespace, so that a particular namespace administrator may only access data relevant to their account.

Figure 2:
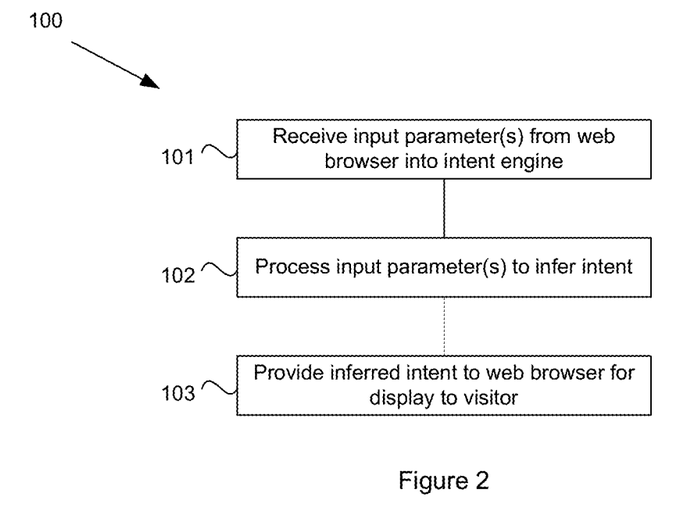
FIG. 2 depicts a flowchart of a method for predicting visitor intent.

In FIG. 2, there is shown a flowchart 100 for predicting the intent of a visitor to a webpage of a defined namespace. At step 101, the intent engine 20 receives input parameters, such as a URL or similar webpage identity from the web browser of a visitor. The intent engine processes the input parameters (step 102), for example by referencing historical intent data, to infer one or more intents of the visitor. At step 103, the inferred intents are provided to the web browser for display to the visitor.

Figure 3:
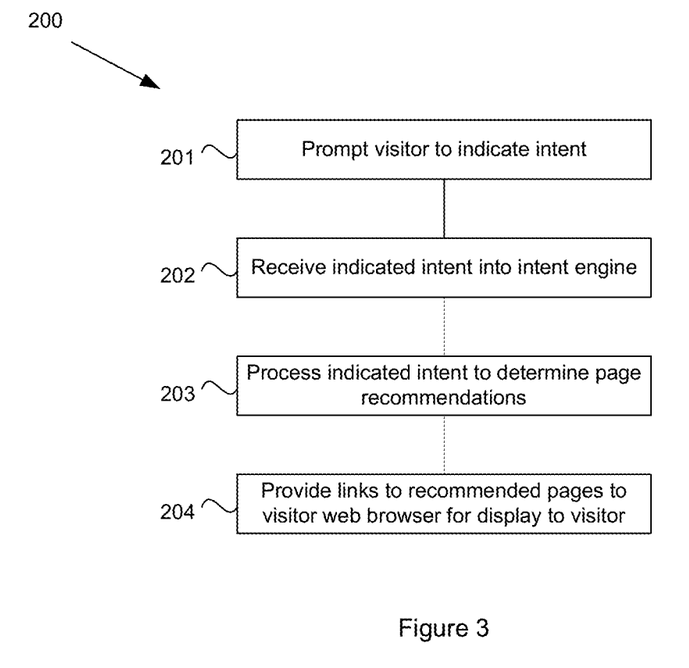
FIG. 3 depicts a flowchart of a method for predicting a navigation destination of a visitor.

A method for predicting a navigation destination for the visitor is depicted in the flowchart 200 of FIG. 3. At step 201, the visitor is prompted to indicate an intent. The indicated intent is received into the intent engine (step 202) and processed to determine on or more web page recommendations (step 203). The intent engine may use the indicated intent to reference to historical intent data provided by previous visitors to the webpages of the namespace. The web page recommendations may be provided to the visitor web browser (step 204) for display to the visitor, e.g. as hyperlinks to the recommended web pages.

In one embodiment, intent and success data may be recorded as a series of data points or page views. Each page view may associate the URL of the viewed page, a current intent indicated in a display element and a success rating provided by the user that indicates how well the viewed webpage matches the current intent. An Intent Ranking Formula, described in more detail below, may be applied to the collective Page View data provided by multiple visitors to calculate intent rankings for webpages within the namespace.

The ranking process may be a two-way process. That is, each URL within the namespace may be associated with a ranked list of intents. Such lists may be used for inferring intents when a visitor navigates to that particular webpage. If the visitor confirms the intent, the visitor may be provided with a list of recommended webpages that also show a strong match to the confirmed intent.

The corollary of the intent ranking is that each Intent may be associated with a ranked list of URLs. The list of URLs may be used to make the recommendations when a visitor has confirmed their intent.

As described above, the intent tool 22 displays intent elements within each webpage of a namespace. The display elements may include an intent indicator, a page recommendation and a rating indicator. The display elements may be provided as a configurable widget 22 that includes coded instructions to reference the intent engine 20 and databases 23 in response to navigation events within the user browser 14. The individual components of the intent tool 22 may be incorporated into the website as a configurable widget.

Intent Management

For consistency and clarity, the following terminology will be used to described the intent based tools and methodologies. However, the terminology is provided by way of example only and is not intended to limit the application and scope of the invention.

Intent—a unique purpose or usage of the website.

Intent Candidates—a ranked list of Intents for the current page.

Inferred Intent—one or more of the highest ranked Intent Candidates for the current page. The intent tool passively applies the Inferred Intent to each page by default.

Declared Intent—an Intent that has been confirmed by the visitor as the purpose for the page visit.

Current Intent—the current user-specified or programmatically inferred Intent for the page visit. The Inferred Intent (top rated) is applied as the Current Intent until the user sets a Declared Intent.

Account—the website vender.

Account NameSpace—collection of domains and web pages for the website vender.

Current Page—the currently rendered Page within a web browser.

Destination Candidates—the ranked list of possible next pages for the Current Page and the Current Intent.

Page—a distinct URL of the NameSpace.

Success—a 'thumbs-up' rating of a page. The highest point value available.

Visitor—users of the vender/customer's website.

The intent engine 20 can be used to integrate a widget 22 into a webpage 13 of a website that allows a user to perform intent based navigation of the website. When a visitor 14 visits a web site, a web page 13 including the widget 22 is displayed in the web browser 14 of the visitor.

Figure 4:
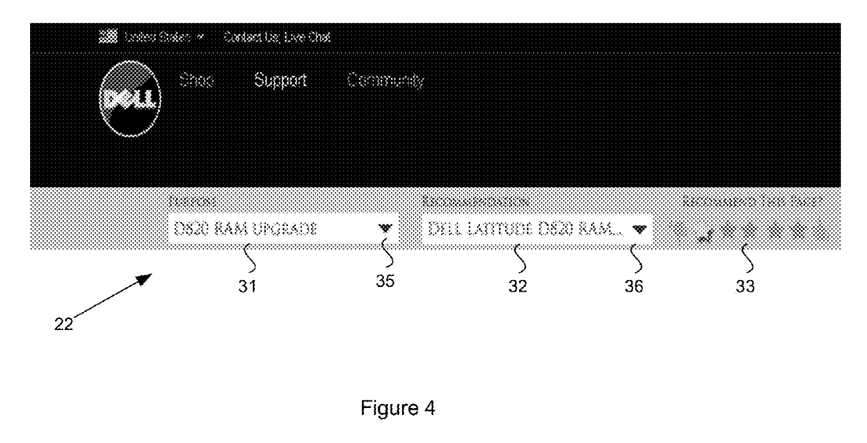
FIG. 4 depicts a configuration of an intent tool.

In one embodiment, the intent widget 22 appears as an unobtrusive but always available "toolbar" on the customer's website. It will be embedded in the page as an integral part of the site. An example of the intent widget is depicted in FIG. 4. It provides features for a Current Intent 31, which may be an inferred intent or an intent confirmed by the visitor, as well as Destination recommendations 32, and a Page Rating 33.

When a visitor first navigates to a webpage within a namespace controlled by the intent engine, the intent engine 20 infers an intent of the visitor. In one embodiment, the URL of the current page is provided to the intent engine, which uses the URL as a lookup to the database 23. The URL reference returns a ranked list of intent candidates and the intent engine selects the highest ranked intent for that URL as the inferred intent. The inferred intent is displayed in a current intent field in the intent display of the webpage 13. The inferred intent may be continuously updated as the visitor navigates to other webpages within the namespace. The visitor may click a drop-down/pop-up 35 that displays the ranked list of other Intent Candidates for the current URL. Additionally, the visitor may type their own Intent into the intent tool. During text entry, the intent engine 20 may attempt to display auto-complete suggestions to help the visitor identify known reasons for visiting the website.

Because an inferred intent is the highest rated intent for a particular webpage, displaying the inferred intent can provide a quick indication to a visitor of the most relevant subject matter on that webpage. If the inferred intent does not match the visitor's actual intent, then the visitor may use the intent widget to indicate a more accurate intent and then select the recommended page that most matches their indicated intent.

Once the visitor has selected/declared their intent, the indicated intent becomes the Current Intent and the intent engine 20 stops predicting intents as the user browses the site.

The intent engine 20 also displays a continuously updated Destination Candidate 32 based upon the Current Intent 31. The Destination Candidate 32 may be determined by providing the Current Intent as a reference to the database 23 to retrieve a ranked list of URLs for that intent. In one embodiment, the Destination Candidate may be selected as the highest ranked URL of the Destination Candidate list. In one embodiment, the navigation history of the user may also be incorporated into the selection process so that if the visitor has already visited the highest ranked webpage for the Current Intent, then the Destination Candidate may be selected as the next highest candidate in the destination list, or the next highest and non-visited destination candidate.

By clicking the Destination Candidate 32, the visitor's browser is immediately navigated to the destination page. Alternatively, the visitor may click to view a drop-down/pop-up list 36 of other ranked Destination Candidates. In one embodiment, the Destination Candidate may be displayed only once a user has confirmed their intent.

Users may jump directly to one of the suggested pages and users may rate the current page in respect to the visit intent. Page ratings may be made via various rating systems including a simple thumbs-up/thumbs-down action to indicate success or failure as well as more granular 1-to-5 star ratings of the page's value. Whenever the visitor makes a rating, the rating data is added to other ratings data and used to generate subsequent intent rankings.

The system thus provides a dynamic, self-learning and self-populating navigation assistance tool that aids a visitor to a website to find the information that they are seeking.

Consider an Inferred Intent that has not been confirmed by a visitor as the visitor's intent. The visitor may still indicate how well the webpage content matches the inferred intent. If the rating is poor, then this poor rating will affect future inferred intent calculations, making it less likely that that particular intent will be an inferred intent for that particular page for subsequent visitors. Consequently, an alternative and potentially more relevant intent will be inferred for that webpage which may receive more favorable visitor ratings.

Consider now a Confirmed Intent. When the visitor first confirms their intent, they are presented with recommended links to the pages that are rated most highly for that intent. If the visitor navigates to a recommended page but is of the opinion that the page content does not match the visitor's intent, then the visitor may rate the page poorly. When the same situation occurs for a subsequent visitor, i.e. same intent, the updated intent rating statistics may cause an alternative (and potentially more relevant) page to be the most highly ranked page for the confirmed intent, and so the subsequent visitor will be recommended to the alternative page.

User indicated rankings provide a direct method for ranking a webpage. However, other more passive methods may also be incorporated as alternatives or in addition to the user rankings. For example, in the absence of a specific rating, navigating away from a webpage without performing any action on the webpage may be used to infer that the content did not match the visitor intent. Performing an action on the webpage, reading to the bottom of a screen, or lingering on the webpage, may be used to infer that the content of the webpage matches the visitor's intent. All of these could be used to determine if the page was successful but user rankings may be given the highest priority.

In one embodiment, the configuration tool may also show a historical ranking of the intent for the webpage. The historical ranking may be an average ranking, a weighted average ranking, a last ranking, or some other ranking.

In the example of FIG. 4, the widget 22 is shown incorporated into a webpage for Dell Computers. The widget 22 includes a current intent 31 as "D820 RAM upgrade". A user may alter the current intent by selecting other intents from a drop down menu 35 or by typing text directly into the current intent field 31. Based on the current intent, the widget 22 displays a recommendation 32 that provides a hyperlink to a webpage within the namespace that is most likely to provide the information that the visitor is seeking, i.e. that matches the current intent. While the highest recommendation is automatically shown by the widget 22 in the recommendation field 32, other recommendations may be viewed and selected from a drop down menu 36. In the present example, the visitor is recommended to a page that is dedicated to "DELL Latitude D820 RAM Upgrades".

At any stage, the visitor may select the rating tool 33 to indicate a rating of the webpage for the current intent, whether or not the visitor has confirmed the current intent 31 and whether or not the visitor has followed a link in the recommendation field 32. As shown in FIG. 4, the rating tool includes a scale for the visitor to rate the current page against the Current Intent. In one embodiment, a 7-point scale is provided using which the visitor may rate pages via a simple thumbs-up and thumbs-down to indicate Success (6) or Failure (0), or they may choose to give the page 1 to 5 stars to indicate degrees of Success. Other rating systems such as a score out of 10, position on a slide bar, selection of a category (e.g. highly relevant, moderately relevant, not relevant, etc) will be apparent to a person skilled in the art and particular rating systems are not intended to be limiting.

The visitor does not have to fully understand the "Success" paradigm or the nature of the 7-point scale. They may simply interact with familiar concepts, thumbs-up/down and a range of stars, as they see fit.

Figure 5:
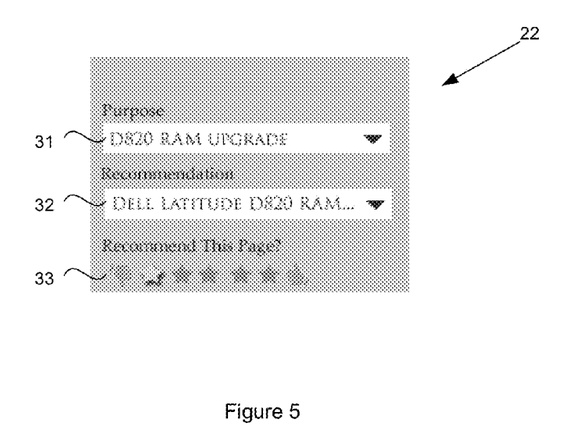
FIG. 5 depicts an alternative configuration of the intent tool.

The intent widget 22 shown in FIG. 4 is one example configuration and a person skilled in the art will recognize that multiple configurations are possible. FIG. 5 shows an alternative configuration in which the widget 22 is displayed in a vertical configuration, with equivalent fields for current intent 31, recommendation 32 and rating tool 33 as shown for the horizontal implementation 22. In alternative configurations, each of the intent display elements may be provided at separate locations within a rendering of the webpage. Some of the intent display elements may also be hidden within the page until activated or required by the visitor. For example, the recommendation field may be hidden until the visitor confirms their intent.

The widget may be configurable to allow variations to size, position, display order of elements, collapsibility, etc. In addition, the tool may be skin-able to present a company logo and/or a background that reflects the website vender's 16 own branding.

Other display options are possible for the widget. In alternative embodiments, the intent tool may be presented as a floating toolbar that scrolls with the page, or as a widget that is collapsible to a small, floating intent tool indicator. The intent tool may also be provided as an optional browser extension that is used instead if the user has them installed. While the examples show single intents and single recommendations, the display of the widget may be altered so that multiple intents and/or multiple recommendations are shown at any one time.

Figure 6:
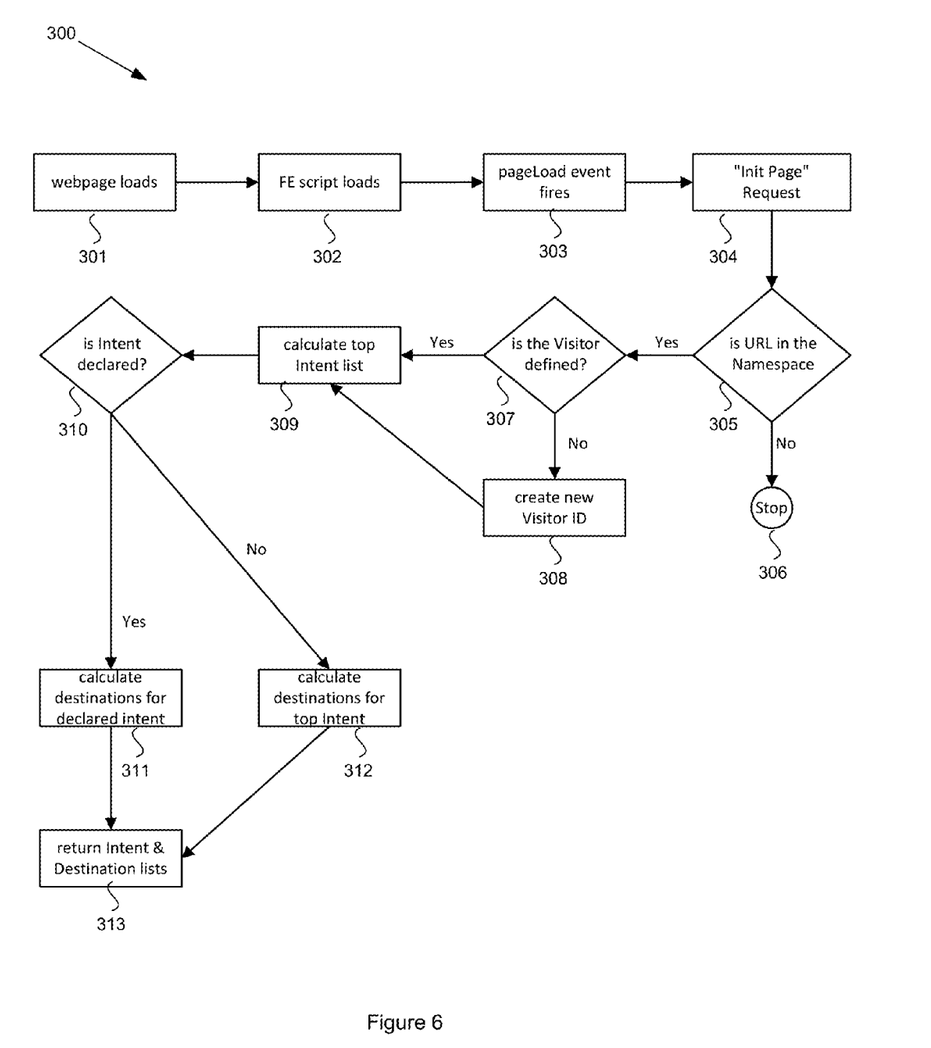
FIG. 6 depicts a process for loading an intent tool into a web browser.

A process for loading the intent widget will now be described with reference to FIG. 1 and the flowchart 300 of FIG. 6. At step 301, the webpage begins to load in the visitor's browser, e.g. in response to a page request from the visitor 14. The loading of the web page triggers the execution of the intent tool script (step 302). A pageLoad event fires at step 303 causing an Initialize Page request to be sent to the intent engine 20. In these steps, the Intent Engine matches the current URL to the list of Predicted Intents and links to recommended pages associated to the current URL. The predictive intents and recommended pages are transmitted to the browser for display in the widget.

At step 305, the intent engine 20 ascertains whether the URL is a valid URL within the namespace of a website governed by the intent engine 20. If the URL is invalid, the process stops (step 306). If the URL is valid, the intent engine then optionally determines whether the Visitor is defined (step 307). If the Visitor is not defined in the intent engine, then a new Visitor ID may be created (step 308). The process then proceeds to calculate a top intent list (step 309). The top intent list may be determined using the URL, a Visitor ID, or other parameter as a lookup to the intent data of the intent database 23.

The process 300 then determines whether the visitor has confirmed or declared an intent (step 310). If the intent has been declared, the declared intent and namespace is used as a lookup to the database 23 to determine one or more recommended URL destinations within the namespace that match the declared intent (step 311). If no intent has been declared, the top intent is used as the lookup reference instead (step 312) to generate the recommended URL destinations. At step 313, the intent and destination lists are returned by the intent engine to the web server 12 to be incorporated in the widget 22 displayed in the web page 13 provided to the user browser 14.

Figure 7:
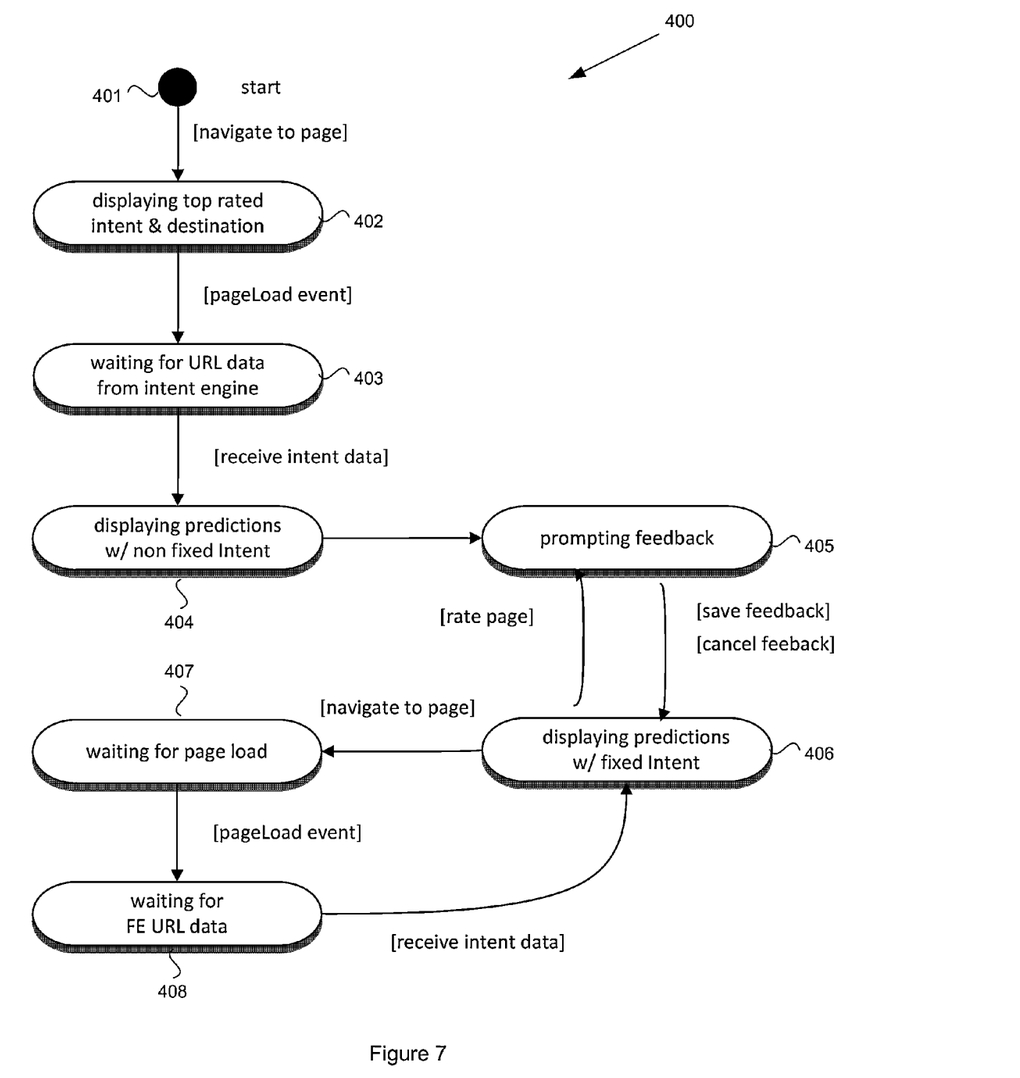
FIG. 7 depicts a state diagram of an intent tool.

A state diagram 400, illustrated in FIG. 7, shows states of the widget within a website as a visitor navigates their way around the website. After starting 401, the widget displays the top rated intent and destination data 402. After a pageload event, the widget waits for inferred or predicted intent data and recommendations from the intent engine for the URL to which the user has navigated 403. After receiving the intent data, the widget displays the predicted recommendations 404 based on inferred intents. The widget then prompts or awaits feedback from the visitor to rate the URL for the indicated intent 405. Rating feedback for an indicated intent is recorded in the database 23 and used to prepare future intent ratings and recommendations. Visitor feedback may include page ratings and intent selections as well as selection of recommendations. If the feedback from the visitor includes a confirmation or indication of the visitor's intent, then the widget state moves to displaying predications based upon the confirmed intent 406. The widget state returns to feedback prompting 405 in which the same feedback actions, including recording page ratings, can be made as previously, though now based upon the confirmed intent. If the user navigates to another URL within the namespace, the widget waits for a pageload of the new URL 407, and then waits for intent data from the intent engine 20 for the new URL 408. The widget then returns to the state 406 in which recommendations for the confirmed intent are displayed.

A high level data flow diagram will now be described with reference to FIG. 8. When an administrator of a website or namespace that includes multiple pages embarks on an installation and configuration process 71 of the intent widget 22, customer source files are provided from a source file database 72 of the intent engine. When a web page is requested from a user browser 74, the web page files, such as HTML and JavaScript files are provided to the Load Web Page process 75. The process 75 executes the intent widget script which causes an "Init Page" request 76 to be sent to an initialize view process that executes in the intent engine. The initialize view process 77 retrieves namespace data from a customer database 68 in order to validate that the requested page is part of a namespace controlled by the intent engine and to ascertain any rules that are dependent on that namespace. Assuming authentication, intent variables are then retrieved from an intent candidate cache 78, and ranking data from a page intent ranking data store 79.

The intent candidate data and page intent ranking data is returned to the load web page process 75 for rendering the web page, including the intent widget, to the user's browser 75. For statistical recording, the page for which intent data was requested may be recorded to a page view datastore 69.

Figure 8:
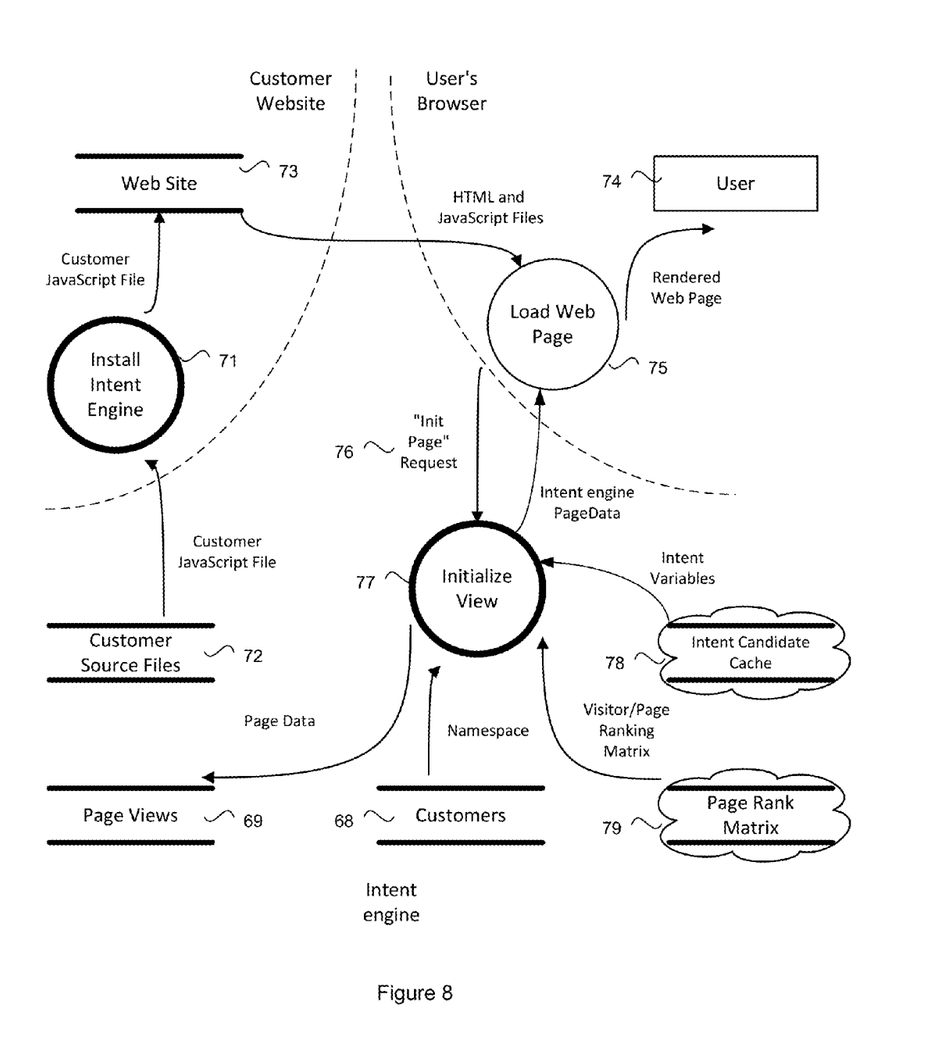
FIG. 8 depicts a high level dataflow for an intent engine.

Each of the datastores illustrated in FIG. 8 may be provided as components of the database 23 of FIG. 1.

Figure 9:
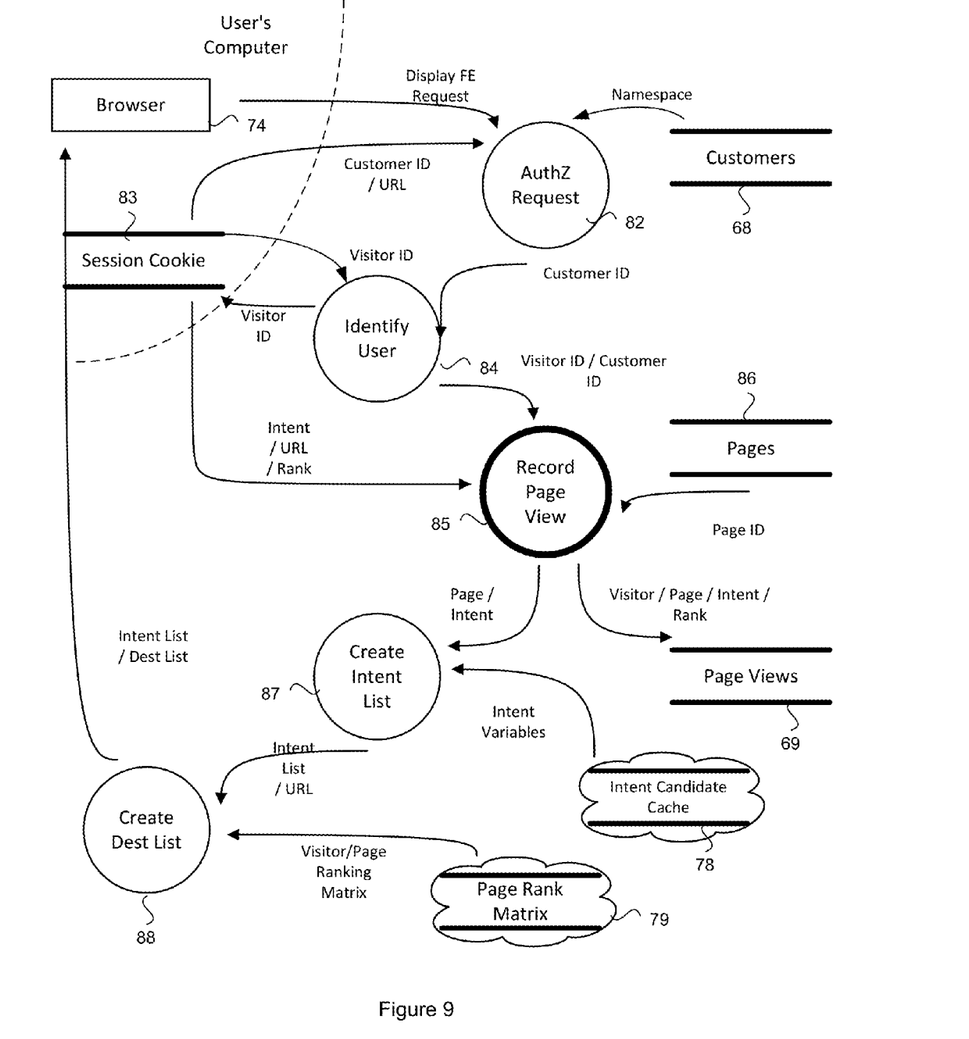
FIG. 9 depicts dataflows for a page initialization process.

Dataflows during the "Init Page" process are shown in more detail in FIG. 9. Within the user's browser 74, a request 81 is provided to the intent engine to trigger an authorization process 82 within the intent engine. The intent engine receives a customer ID or URL from a session cookie 83 of the user browser 74 and uses this information as a lookup to the customer/namespace database 68 to confirm that the URL is within a valid namespace of the intent engine. If the authorization proceeds, the authorization process 82 passes the Customer ID to an Identify User process 84. The process 84 receives a visitor ID from the session cookie 83 and passes the Visitor ID and the Customer ID to a Record Page View process 85. If the visitorID has not been defined a new visitorID is generated and returned to the session cookie. The Record Page View process includes identifying the page, caching the page view and writing the cached page view to the Page Views datastore 69. The page may be identified by receiving a Page ID from a pages datastore 86. The Record Page View aggregates the Page ID, Visitor ID as well as any Intent and Ranking information from the user session 83 and stores this data collectively in the Page Views datastore 69. When a page load happens the visited page is associated with the intent and given a default rank. Thus each page load does affect the rank but much less than a user defined ranking.

The Page and Intent information is then passed to a Create Intent List process 87. The page data is used as a lookup to the Intent Candidate Cache to retrieve one or more intent candidates. The process 87 creates an intent list of intent candidates which is then passed to a Create Destination List process 88. The current intent and URL are used as a lookup to the Page Rank Matrix 79 to select recommended URLs that match the current intent. The Process 88 creates the destination list and then passes the intent list and the destination list to user browser 74 for display in the appropriate fields of the widget.

As described above, a user may indicate their intent by selecting an inferred intent from the intent field of the widget or by entering a new intent into the intent field. The confirmed intent is sent to the session cookie 83 which prevents the Page Initialization process from generating inferred intent lists each time the Visitor navigates to another webpage of the namespace.

If the intent entered is a new intent for the namespace and/or the particular URL, the intent may be entered into an Intents datastore, provided as part of the database 23. When subsequent visitors use the widget, the user-entered intent may be listed as an inferred intent, in particular where that intent has been rated highly for the URL or namespace. By allowing users to enter and rate their own intents, the intent engine can be provided as a dynamic self-learning and self-populating system.

Page Rating

One data point that drives the intent engine is the visitors' rating of pages. This value drives the calculation of Inferred Intent and Recommended Destination pages.

Rating Scale

Page Ratings may be recorded on a 7-point (0 to 6) scale with zero indicating Failure and 6 indicating Success.

|  | Value | Description |
| --- | --- | --- |
| Thumbs-down | 0 | Failure |
| 1-Star | 1 | Not very useful |
| 2-Stars | 2 |  |
| 3-Stars | 3 | Moderately useful |
| 4-Stars | 4 |  |
| 5-Stars | 5 | Very Useful |

Ratings Data

All page ratings are recorded in respect to the visitor's Current Intent. Only one record will be recorded per visitor, per page, per intent. Therefore, if during a single website browsing session the visitor rates the same page twice, then the second rating replaces the first rating of the page.

The Page rank data structure may be depicted as follows:

| Field | Type | Notes |
| --- | --- | --- |
| ID | int | Identifies a unique visitor-page-rank instance |
| PageID | int | The page |
| VisitorID | int | The visitor |
| TimeStamp | DateTime | When |
| IntentID | int | The Intent |
| Rank | byte (a small # data type) | The ranking |

Figure 10:
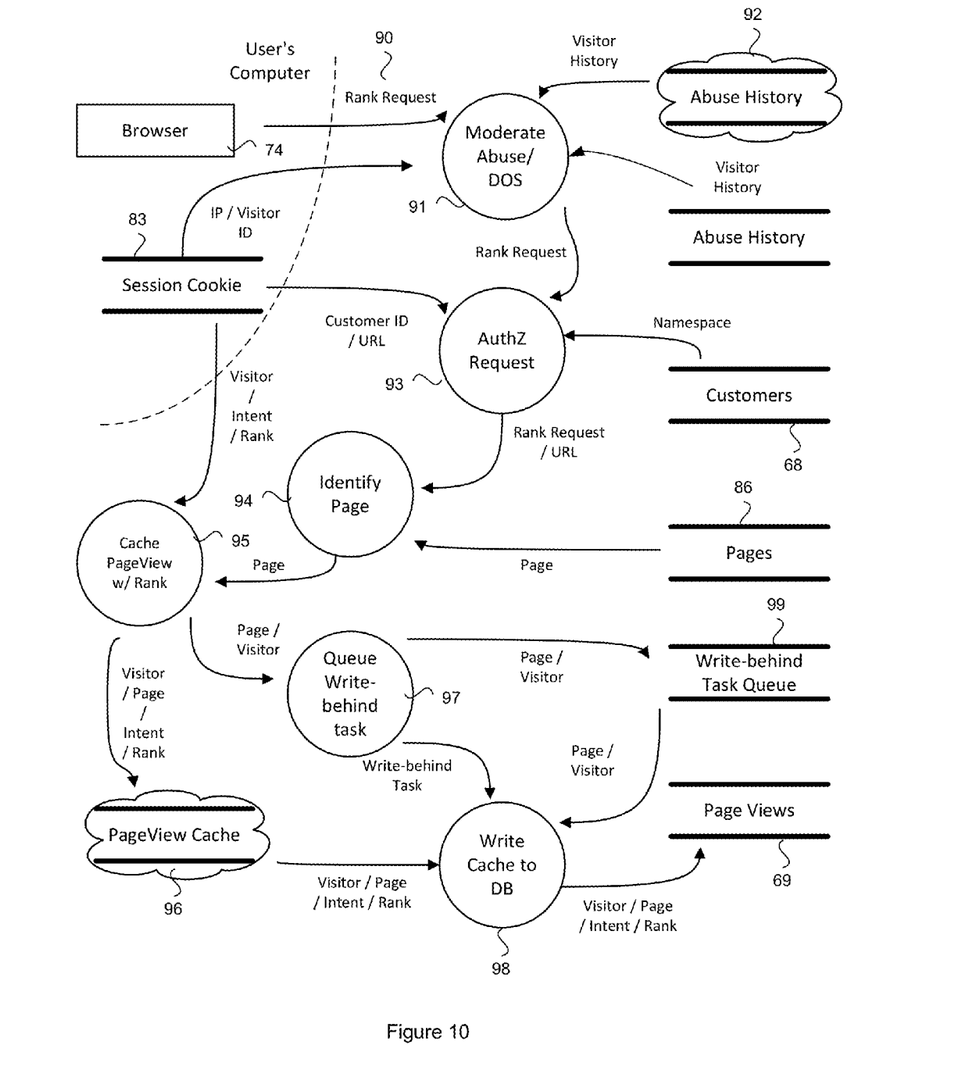
FIG. 10 depicts dataflows for a process of recording a page/intent ranking.

The dataflows for page ranking are illustrated in FIG. 10. When a user provides a ranking, a rank request 90 is first sent from the user browser 74 to the intent engine 20. The rank request triggers a Moderate Abuse process 91 which uses t Visitor ID to retrieve a visitor history from an abuse history datastore 92. The visitor history is processed to determine whether the visitor has a history of spamming or otherwise mis-using the intent engine processes.

If the abuse history is clear, then the rank request is passed to an authorization request process 93. The authorization process 93 is similar to the process 82 described above in FIG. 9 and uses the customer ID or URL received from the session cookie 83 of the browser 74 to ensure that the URL involved is within a namespace governed by the intent engine. Identifying the namespace within a customers datastore 68 also allows any namespace specific rules to be determined.

Once authorized, an Identify Page process 94 is triggered which uses the URL provided from the Authorization process 93 to extract a page identity from the Pages datastore 86. A Cache Page View with Rank process 95 is then performed. The caching process 95 receives the visitor, intent and rank data from the session cookie 83 and the page data from the Identify Page process 94. This data is cached as a PageView in the PageView cache while a Queue Write-behind Task 97 is prepared. When the queue 99 reaches the specific cache writing task, a Write Cache to Database task 98 retrieves any pageview data from the cache and writes to the Page Views datastore 69. At the end of the process, the Page Views datastore includes one or more page views that each associate a page (URL), an intent and a visitor ranking of the intent for the page.

The Intent Ranking Formula

The page/intent/ranking data of the Page Views datastore 69 may be processed by the intent engine to periodically calculate ordered lists of ranked Intent Candidates and ordered lists of Destination candidates per page per intent.

The processing of the data may be based on an intent ranking formula that may be fixed or may be configurable per namespace account. Various ranking formulas may be used and many standard formulas will be apparent to a person skilled in the art. In a simple embodiment, the ranked lists may be generated by averaging a ranking of a page/intent combination across all applicable page views that include that page/intent combination. In a more complex formula, page view dated may be aged so that more recent data is weighted favorably while page view data older than a particular threshold is ignored completely.

In alternative embodiments, more complex intent ranking formulas may be applied. In one embodiment, there are three variable types and each variable is calculated at the Page and Site scope for a total of 6 variables. Each variable has a value between 0 and 100 and is then multiplied by an Account specific modifier to customize the formula for each Account.

Unit Days

A portion of the Intent Ranking Formula is time sensitive so that more recent feedback may be weighted accordingly. The Unit Days attribute determines how quickly the time element ages feedback and it allows the formula to work equally well on busy and slow websites. Essentially, this attribute determines how many days of values to group together in each "bucket" of aged results. The default value, 1.0, ages data every day. Adjusting this value to 2.0, for example, ages the data every two days. While adjusting this value to 7.0 ages the data every 7 days.

Freshness Value

The Freshness Value uses the Unit Days attribute (above) to reflect how recently a given Intent has been used. With this value, the "freshness" of the data exponentially effects the Intent ranking, with newer entries valued more than older entries.

Page Freshness

Page Freshness is calculated per Intent per Page. It indicates how recently a given Intent was used for the current page.

Site Freshness

Site Freshness is calculated per Intent for the entire site or namespace. It indicates how recently a given Intent was used anywhere on the site.

Freshness Modifier

For each Freshness calculation, page and site, the Account Administrator may adjust a modifier value to increase or decrease the affect of Freshness on the Intent Ranking. Therefore, by adjusting the Unit Days attribute and the Freshness Modifiers the Account Administrator has significant control over the time-sensitiveness of the Intent Ranking Formula. The default Freshness Modifier is 1.0.

Popularity Value

The Popularity Value reflects how often a given Intent has been used.

Page Popularity

Page Popularity is calculated per Intent per Page. It indicates how frequently a given Intent was used for the current page.

Site Popularity

Site Popularity is calculated per Intent for the entire site or namespace. It indicates how frequently a given Intent was used anywhere on the site.

Popularity Modifier

For each Popularity calculation, page and site, the Account Administrator may adjust a modifier value to increase or decrease the affect of Popularity on the Intent Ranking. The default Popularity Modifier is 1.0.

Effectiveness Value

The Effectiveness Value reflects the visitor page ratings for a given Intent. In other words, it indicates how high or low visitors rated pages overall when using each Intent.

Page Effectiveness

Page Effectiveness is calculated per Intent per Page. It indicates how well visitors rated the current page per Intent.

Site Effectiveness

Site Effectiveness is calculated per Intent for the entire site or namespace. It indicates how well visitors rated all pages on the site per Intent.

Effectiveness Modifier

For each Effectiveness calculation, page and site, the Account Administrator may adjust a modifier value to increase or decrease the affect of Effectiveness on the Intent Ranking. The default Effectiveness Modifier is 1.0.

Summary of the Intent Ranking Formula

It can be seen from the above, that the Intent Ranking Formula may be provided in various embodiments as a combination of three types of values (Freshness, Popularity, and Effectiveness) measured at two different levels of scope (Per Page and Per Site) for a total of 6 different variables. In addition, each variable may be modified by a fixed multiplier to increase or decrease the importance of each variable for the site.

The intent ranking formula may applied each time the formula is updated. All matrixes would be recalculated at that time otherwise the current formula is used for all calculations of new and updated data. Calculations of intent rankings may be made on a periodic basis, e.g. hourly, daily, etc or may be made on the fly, i.e. each page view or after a threshold number of page views. Other timeframes will be apparent to the person skilled in the art.

Figure 11:
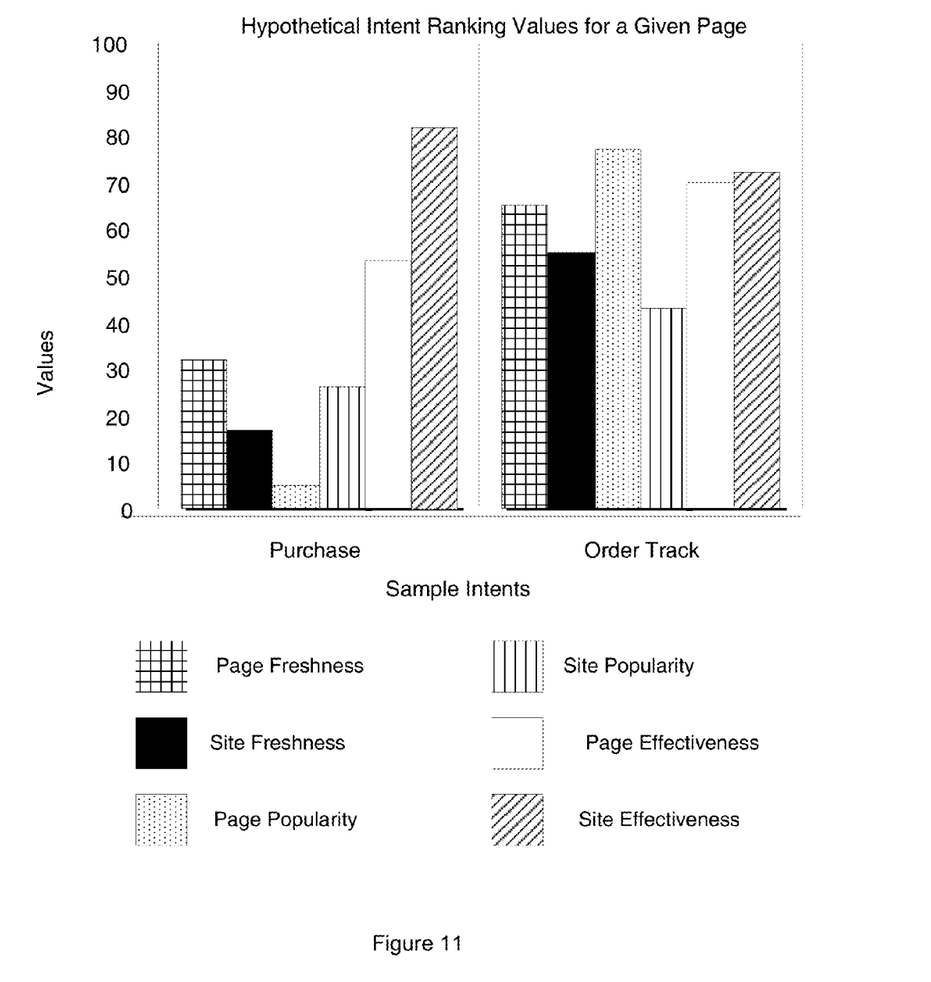
FIG. 11 depicts a chart indicating how intent ranking parameters may differ for differing web pages.

FIG. 11 shows a chart of a hypothetical visualization of how the Intent Ranking Formula might evaluate a "purchase" intent and an "order tracking" intent for a single page on a customer's website.

As described above, the intent engine 20 may be provided as a third party offering to namespace administrators. These administrators may thus be considered as customer's of the intent engine. The intent engine 20 may provide a database-backed interface 16 to allow a customer to administer their intent engine account. This includes defining and configuring the customer's namespace, configuring and monitoring Intent options, and viewing various usage and trending reports.

In addition, an Intent Engine administrator website allows for the intent engine administrator 18 to configure and monitor of the entire intent engine system and customers. This includes overall reporting, support, billing, and access control.

Page Management

In general, the intent engine's algorithms and features are page-centric. Thus, Page Management is a critical step in configuring and managing an intent engine installation.

The intent engine tracks each distinct URL of a NameSpace as a Page. There are many corner cases that affect the definition of a page, but in the most general case the intent engine considers a unique page to be represented by the part of the URL between the Scheme and the Query String.

Page Terminology

There are several contexts of a Page in the intent engine, as follows.

Current Page—represents the URL that the visitor is currently viewing in the browser window. The intent engine 20 uses the top or parent page and ignores iFrames, Frames, and other embedded page types.

Destination Candidate—represents a list of Pages that the intent engine 20 recommends to the visitor based upon the Current Page and the Current Intent.

Recommended Destination—the top rated Destination Candidate.

Destination Link—the dynamically composed URL of a Destination Candidate. It is dynamically composed so that session specific information is handled appropriately.

Page Rules

Account Administrators and Account Moderators may be nominated for each account and allowed modify the Page Rules for an intent engine account. The Page Rules determine how URLs are parsed to identify unique pages and how URLs are dynamically re-assembled to provide Destination Links when the user chooses to jump directly to a Recommended Destination Page.

Basic URL Identification

All URLs are initially identified by the Host and Path. Scheme, Query String, and Fragments are generally ignored in respect to identifying unique Pages. For example:

URL:
http://www.server.com/path/to/file/page.html?one=1&two=2&three=3

| | |
|---|---|
| Scheme | http:// |
| Host | www.server.com |
| Path | path/to/file/page.html |
| QueryString | one=1&two=2&three=3 |

Supported Scheme

The intent engine 20 may track which schemes have been used to view each rated page. The visitors' current URL scheme may be used for destination pages when possible. Therefore, if the destination page has only been viewed via HTTPS and the visitor is on another page using HTTP, then the destination page link will use HTTPS. However, if the page has been visited via both schemes, the user's current scheme will be used. Optionally, the Account may be configured to always use the visitor's current Scheme when constructing Destination Links.

Authority (Sub-Domain)

Customer NameSpaces may be configured to dynamically handle URLs that are differentiated only by the authority/sub-domain. For example, the JCPenney NameSpace would be configured such that ww2.jcpenney.com and ww5.jcpenney.com are considered the same URL. However, blog.jcpenney.com and search.jcpenney.com may be treated as different URLs. By default, all Host name permutations will be treated as unique and independent. The Customer NameSpace may be configured with regular expressions that describe Host names that should be treated the same.

Default Query String Management

In general, Query Strings will be ignored by the intent engine's page definitions. That is, the uniqueness of a page is not determined by the Query String. However, the intent engine 20 may track which Query String Parameters have been used for each page and what value was assigned to each parameter the first time it was encountered. These values will be used to help construct Destination Links.

Destination Links will be crafted based upon the visitor's current page Query String and the known Query String Parameters supported by the destination page. For example, for a given url such as:

www.server.com/pageone.html?state=ny&color=blue, the intent engine may record the following types of information about the url.

| URL ID | Param | Default Value |
|--------|-------|---------------|
| 101    | state | ny            |
| 101    | color | blue          |

For a future visitor that is viewing the page www.server.com/pagetwo.html?state=tx&sz=lg, the intent engine's Destination Link to pageone will be composed by comparing the visitor's current Query String Parameters to those known to be supported by the intent engine.

"state" is supported by pageone and included in the visitor's current page.

Parameter values will be used from the current page when possible. Therefore, the "tx" value will be assigned to "state" for the Destination Candidate link.

"color" is supported by pageone but not included in the current page. "color" with the default value "blue" will be used for the Destination Candidate link.

"sz" is included on the Current Page, but not in the Destination Candidate. Therefore "sz" will not be included in the Destination Candidate link.

Therefore, the Destination Link from pagetwo to pageone for this user will be: www.server.com/pageone.html?state=tx&color=blue Fixed Query String Parameters Many websites will require additional configurations to intelligently handle Query String Parameters. A common example would be a url like http://www.google.com/search?q=schueler where the "q" Query String Parameter (QSP) is critical to the definition of the page. The intent engine may allow customers to configure QSP's that are to be treated as part of the unique identification of a page.

In this case, "q" would be identified as a Fixed QSP and thus the intent engine will record unique page instances for http://www.google.com/search?q=schueler and http://www.google.com/search?q=beynon and will not replace the "q" value when constructing Destination Candidates.

Managing Account Intents

Account Administrators and Account Moderators may view and edit the list of known Intents for their NameSpace. In particular, new intents may be added and intents may be deleted, in particular where those intents have been indicated by visitors to the page. Intents provided by visitors may also be modified by the administrators/moderators, for example, to use consistent terminology and/or terminology preferred by the namespace owner.

Site Conversion

Website "conversion" is one of the most traditional and widespread measures of a site's effectiveness. Analytics packages and entire web site strategies are often geared around a company's definition of "conversion" of a site visitor. Conversion may be defined in a multitude of ways including purchasing a product, subscribing to a newsletter, submitting contact information, or becoming a "fan" via a social networking site.

The intent engine 20 provides a model for incorporating traditional site Conversion metrics into aggregate intent data.

Conversion Rules

The Account Administrator may define a set of Conversion URLs via regular expressions. The intent engine 20 will provide a set of example regular expressions that will match a variety of common URL patterns. One usage option will be to append a specially coded Query String Parameter to any URL on the site that will indicate that the user has completed some form of conversion.

Whenever a Conversion URL is encountered, the intent engine will record the instance and gather aggregate data about pre-defined conversion that may be viewed via the intent Reports.

Conversion Rule Data

| Field | Description |
|-------|-------------|
| ID | unique identifier |
| Name | Short descriptor |
| Marketing Campaign | Optional. ID of corresponding marketing campaign. |
| URLs | Set of regular expressions that trigger conversion. |
| Start Date | Beginning of date range when the rule applies |
| End Date | End of date range when the rule applies |

Conversion Event Data

Once a visitor has triggered a Conversion Rule, the intent engine 20 will record the Conversion Event using data similar to the table below. However, the system may be configured so that a visitor will only trigger a Conversion Rule once per visit even if they load multiple URLs that match the given regular expression(s).

| Field | Description |
|-------|-------------|
| Conversion Rule | Which rule triggered conversion |
| Converted_At | Date/Time of the event |
| URL | The source URL of conversion |
| Intent | The user's current intent, if defined. |

Campaign Management

Campaigns are the website owner's method for implementing temporary modifications to the intent engine's configuration to achieve specific marketing or support goals.

Pre-Seeding Campaign

Pre-seeding campaigns are used to "seed" the intent engine with sufficient data for the system to be released to the general population.

The first step of a pre-seeding campaign is to manually enter Intents and Destination Links for the NameSpace. A user interface is provided to the namespace administrator 16 to allow administrators and moderators of a namespace to enter the required values and match them together and to store the pre-seed data in the databases 23 of the intent engine 20.

The second step of a pre-seeding campaign is to invite a select group of users to browse the website with the intent engine in seeding-mode for that namespace. For example, the pre-seeding visitors may be prompted to rate the webpages for the visitor's intent with all the data being stored as seed data that will later be used to make recommendations. For the pre-seeding visitors, all recommendations may be blocked until sufficient data has been stored so that statistically relevant recommendations can be made. Options for pre-seeding visitors include hiding all Destination Recommendation features, hiding for X % of visitors but displaying for y %, only displaying recommendations for users within a certain IP range (employees pre-seed), displaying for users with a certain cookie, prompting for a list of intents on each page, not just one intent, etc. Other pre-seeding options and strategies will be apparent to a person skilled in the art.

Spotlight Campaign

A spotlight campaign may be used to artificially promote certain Intents and/or Destination Candidates to highlight items for customer support or marketing purposes.

Options for spotlighting may include, artificially inflating the ranking of an Intent across the site or for a range of pages, artificially inflating the ranking of a Page for a set of Intents and/or inserting a new, temporary Intent, that only exists for the duration of the Campaign Content Moderation A Content Moderator may be provided for each customer account and may use the intent engine website to manage Content Filters, Content Governors, and Content Alerts.

Content Filters

Content filtering rules provide two levels of brand protection. First, the Moderator may establish the Acceptable Use Policy filters that determine which words and phrases that should be blocked for the website community. Second, the Moderator may establish procedures for dealing with content that violates the site's AUP.

AUP Language Filter

Moderators may upload and edit a word list of unacceptable words that will be filtered from the site. In one embodiment, a pre-loaded or default wordlist may be provided.

AUP Brand Filter

Moderators may also upload and edit a word list of competitor brand related terms that may be moderated differently than swear words. This list aims to protect the site from crowd based attacks on the integrity of the intent engine's data set. For example, a manufacturer of one type of product may wish to prevent a visitor from specifying an intent to buy a rival manufacturer's equivalent product.

AUP Filter Actions

The Moderator may be provided with the ability to configure Filtering Actions for both the Language Filter and the Brand Filter. Unique actions may be configured based upon the violated filter and the type of content.

Mask Words

Entries are accepted by the system but triggering words are masked with a pre-defined character sequence. The Moderator may choose the masking character and a fixed number of times to use the character. Thus, no matter the length of the word it will be replaced with a fixed length character mask. This may be provided as the default for Open Text Entries that violate the Language Filter.

Discard Entries

Entries are discarded before being saved to the database. A running log is updated to note the action, but the actual entry is not saved. This may be the default setting for Intent Entries that violate the Language Filter.

Moderator Alerts

Entries are accepted into the system and put into immediate use. However, the Account Moderator is alerted and given the opportunity to remove the entry. Notification is a two-fold process. First, a daily email is sent to the Moderators with a summary of the Content Alerts. Second, the intent engine website's account moderation screen will provide access to entries that may need moderating based upon the Language and Brand Filters. The Moderator may choose to apply word masks or hide the entries from users. This may be the default setting for Intent Entries and Open Text Entries that violate the Brand Filter.

Moderator Approval

Entries will not be shown to future users until a Moderator approves them. These Entries will be listed in a "pending" list until the Moderator approves or discards each entry. Discarded entries will be purged from the system.

Governors

Account Moderators may configure various governors to try to prevent abuse of the intent engine system. For example, user Governors may be designed to prevent a given user, or Bot, from flooding the intent engine. User governors may be based upon an IP address, cookies, limiting new intents submitted per user per timeframe, limiting intent Page Views submitted per user per timeframe, limiting page ratings submitted per user per timeframe. Content governors may be employed to protect the intent engine from crowd-based attacks to game the system. Content governors may be language and/or brand filter based.

Alerts

Account Moderators may receive various intent engine usage alerts as will be described below.

Language & Brand Filter Thresholds

The Moderator may define a per hour threshold for the usage of any word or phrase in the Language and Brand filter lists. When this threshold is exceeded an email is sent to the account Moderator. The threshold may be throttled uniquely for each filter list and it may be turned off temporarily.

Volume Thresholds

The Moderator may define per hour and per day volume thresholds for Intent Page Views, New Intent Submissions, and Page Ratings. Thresholds may be specific counts (i.e. >10 k) or based on relative changes.

Black List and White List Alerts

Moderators may configure a Black List of undesirable words or phrases and a White List of desired words and phrases. Usage of these words in a new intent or open text feedback will immediately send an email alert to the Moderator in case immediate action is required.

Reports

Account Administrators and Moderators may view various reports about intent engine usage and trends. These reports may be executed as one or more queries to the database 23 coupled to the intent engine 20.

For example, an overall site success report may specify: Overall site success percentage; Conversion percentages (for each Conversion Rule); Search percentage; Browse percentage.

An Intent Summary Report may include statistics for Success percentage per Intent; Top Success Pages per Intent; Conversion percentages per Intent; Filter by User Generated Intents vs pre-defined Intents.

An Intent Drill Down Report may include statistics for Overall success of an Intent; Most Effective (highly rated) Pages of an Intent; Popular Pages of an Intent.

A Page Summary Report may include statistics for Listing of pages as defined by the intent engine, which may be sorted by Intent when viewing the page; intent engine Effectiveness (user ratings); intent engine Popularity (viewed with any Intent) and Conversion.

A Page Drill Down Report may list all Intents used for the given Page as well as Intent Effectiveness on the page, Conversion on the page and Success (highest rating) on the page.

As described above, the intent engine service website provides a turn-key service for subscribing, implementing, monitoring, and maintaining the intent tools on a customer's website. A customer may subscribe to the intent engine by filling out a secure web-form which identifies the business account and the initial administration user. From there, the customer may download the necessary files to begin the intent engine rollout on their own website.

Business Account (Account)

All subscription levels will provide at least two initial User Seats (Users). The first User will be given Account Administrator rights and the second user will be given Account Moderator rights. Additional seats may be available depending upon the subscription level or may be added a la carte.

Account data may include:
Company Name
Business Unit (optional)
Subscription Settings
Current subscription level & status
Monthly or Annual payments
Subscription history
Billing Info (address, payment information)
Billing Contact
Address
Payment method
Credit Card or Purchase Orders
Payment history
An Account Manager
Users
Account administrators (which users may manage the account)
Account Moderator
NameSpace
Rules that define the websites that the intent engine will support.
Account NameSpace The Account NameSpace (NameSpace) defines the websites that will be supported by this Account. Typically, only one NameSpace is provided per Business Account, but the NameSpace may represent multiple websites.

A typical example would be where a NameSpace includes variations of a domain name and/or geographic indications, such as .com and .co.uk.

The NameSpace is defined by one or more Regular Expressions. Sample Regular Expressions may be provided that cover several basic types of NameSpace definitions.

From the foregoing, it can be seen that the functions of intent engine may be incorporated into webpages by a configurable widget that provides subscribers with an easy to implement, continuously learning, social site navigation system that addresses findability problems on the website. The intent engine increases user success at a low cost to the subscriber and with minimal IT and maintenance commitment.

The intent engine helps website visitors find the content that is most likely to lead to a successful visit based upon the user's reason for visiting the site. The intent engine utilizes a dynamic, crowd sourced, and url aware recommendation system to predict the user's Visit Intent and to suggest Destination Pages.

The intent tool has been described herein as a third party service offering made to owners and administrators of websites and namespaces. A person skilled in the art will recognize that the intent tool can be a tool that is incorporated into a webspace by the webspace administrator directly, without the need for billing aspects and the like.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for predicting an intent of a visitor to a webpage, the method comprising:
   receiving into an intent engine at least one input parameter from a web browser displaying the webpage;
   processing the at least one input parameter in the intent engine to determine at least one inferred intent;
   providing the at least one inferred intent to the web browser to cause the at least one inferred intent to be displayed on the webpage;
   prompting the visitor to confirm the visitor's intent;
   receiving a confirmed intent into the intent engine;
   processing the confirmed intent in the intent engine to determine at least one recommended webpage that matches the confirmed intent, the at least one recommended webpage selected from a plurality of webpages within a defined namespace;
   causing the webpage in the web browser to display at least one link to the at least one recommended webpage;
   prompting the visitor to rank the webpage for the inferred intent;
   receiving a rank from the web browser; and
   storing a datapoint comprising an identity of the webpage, the inferred intent and the received rank.

2. The method according to claim 1 wherein the at least one input parameter comprises an identity of the webpage.

3. The method according to claim 1 wherein processing the at least one input parameter comprises determining a ranked list of intents for the webpage.

4. The method according to claim 3 comprising:
   selecting the highest ranked intent for the webpage; and
   causing at least the highest ranked intent to be displayed on the webpage in the web browser.

5. A method for predicting a navigation destination for a visitor of a webpage belonging to a defined namespace comprising a plurality of webpages, the method comprising:
prompting the visitor to indicate an intent on a webpage displayed at a browser of the visitor;
receiving the indicated intent from the browser into an intent engine;
processing the indicated intent in the intent engine to determine one or more recommended webpages of the plurality of webpages; and
causing one or more links to the one or more recommended webpages to be displayed in the webpage at the browser;
wherein processing the indicated intent comprises using the indicated intent as a reference to intent ranking data that ranks the plurality of webpages for the indicated intent, the intent ranking data comprising intent data provided by previous visitors to one or more webpages of the namespace.

6. The method according to claim 5 wherein processing the intent comprises determining a ranked list of webpages of the namespace for the indicated intent.

7. The method according to claim 6 wherein determining the ranked list comprises processing a plurality of datapoints, each datapoint comprising:
an identity of a webpage of the namespace;
an intent; and
a ranking of the intent for the respective webpage.

8. The method according to claim 5 wherein prompting the user to indicate an intent comprises:
inferring at least one intent from an identity of the webpage displayed in the browser; and
causing the at least one inferred intent to be displayed on the webpage displayed in the browser.

9. The method according to claim 5 comprising:
prompting the visitor to indicate a rank of a webpage for an indicated intent;
receiving the indicated rank into the intent engine; and
storing a datapoint in a database, the datapoint comprising:
an identity of the ranked webpage;
the indicated intent; and
the ranking.

10. The method according to claim 5 wherein prompting the visitor to indicate an intent comprises:
generating a ranked list of intents for the namespace;
causing one or more intents from the ranked list of intents to be displayed in the webpage at the browser.

11. An intent processing system comprising:
an intent engine configured to display an intent tool in at least one webpage when the at least one webpage is loaded into a user browser, the intent tool comprising a plurality of display elements comprising one or more of:
an intent field;
a recommendation field; and
a ranking tool; and
at least one database configured to store intent data;
wherein the intent engine is configured to:
display at least one intent in the intent field;
display at least one webpage recommendation in the recommendation field; and
receive ranking data from the ranking tool and store the ranking data in the at least one database.

12. The intent processing system according to claim 11 wherein the intent engine is configured to:
receive a ranking of a page from the ranking tool;
generate a datapoint comprising:
a current intent indicated by the intent field;
a current webpage loaded in the user browser; and
the received ranking; and
store the generated datapoint in the at least one database.

13. The intent processing system according to claim 12 wherein the intent engine is configured to process a plurality of the datapoints stored in the at least one database to determine a ranked list of webpages for an intent.

14. The intent processing system according to claim 13 wherein the intent engine is configured to:
receive a confirmed intent from the intent field of a webpage loaded in the user browser;
reference a ranked list of webpages for the confirmed intent to select at least one recommended webpage; and
provide at least one link for the at least one recommended webpage to the recommendation field of the intent tool displayed in the webpage loaded in the user browser.

15. The intent processing system according to claim 12 wherein the intent engine is configured to process a plurality of the datapoints received from a plurality of users to determine a ranked list of intents for a webpage.

16. The intent processing system according to claim 11 wherein the intent engine is configured to store a definition of a namespace in the at least one database, the definition of the namespace comprising a plurality of webpages, and wherein the at least one webpage recommendation is selected from the plurality of webpages of the namespace.

17. The intent processing system according to claim 11 wherein the intent tool comprises a configurable widget.

* * * * *